FIG 1

INVENTOR.
PHILLIP N. BRAUN

FIG 2

May 19, 1959 P. N. BRAUN 2,887,314
LAUNDRY MARKING MACHINE
Original Filed Sept. 30, 1954 11 Sheets-Sheet 8

INVENTOR.
PHILLIP N. BRAUN
BY D. Emmett Thompson
Attorney

May 19, 1959 P. N. BRAUN 2,887,314
LAUNDRY MARKING MACHINE
Original Filed Sept. 30, 1954 11 Sheets-Sheet 11

INVENTOR.
PHILLIP N. BRAUN
BY
Attorney

United States Patent Office 2,887,314
Patented May 19, 1959

2,887,314

LAUNDRY MARKING MACHINE

Philip N. Braun, Syracuse, N.Y.

Original application September 30, 1954, Serial No. 459,294, now Patent No. 2,825,480, dated March 4, 1958. Divided and this application September 9, 1957, Serial No. 682,953

3 Claims. (Cl. 271—2.5)

This invention relates to machines for printing and affixing identifying tags to garments and articles processed in laundries and dry cleaning establishments.

In machines of this type, the identifying tags are formed from a tape of sheet material, the tape being advanced or fed from a roll to a printing station where the identifying indicia is printed on the end portion of the tape. The printed end portion of the tape is then advanced to a tag applying station, the printed end portion of the tape being severed to form the tag, and the severed tag being affixed to the garment, or other material, at the tag applying station. This invention has to do in particular with mechanism for automatically feeding the tape. It is a division of my copending application, Ser. No. 459,294, filed September 30, 1954, now Patent No. 2,825,480, issued March 4, 1958, for Laundry Marking Machine.

The invention has as an object a laundry marking machine embodying a novel arrangement for feeding the tape from which the identifying tags are formed, and the invention further includes mechanism for effectively attaching the identifying tag to the garment, or article, by heat sealing the tag to the garment or article, in such manner that the identifying tag remains fixedly attached during the laundering or dry cleaning process, but the tag may be readily removed from the article or garment without any injury to the same.

The invention consists in the novel features and in the combinations and constructions hereinafter set forth and claimed.

In describing this invention, reference is had to the accompanying drawings in which like characters designate corresponding parts in all the views.

In the drawings—

Figure 11 is a view taken on line 11—11, Figure 10, of the tape feed guideway, the tape being omitted and also the feeding carriage.

The machine is preferably mounted upon a cabinet structure 18 having a top wall formed by plates 19, 20, these plates being fixedly secured to the cabinet and having their side edges bent upwardly to form vertical flanges.

Figure 1:
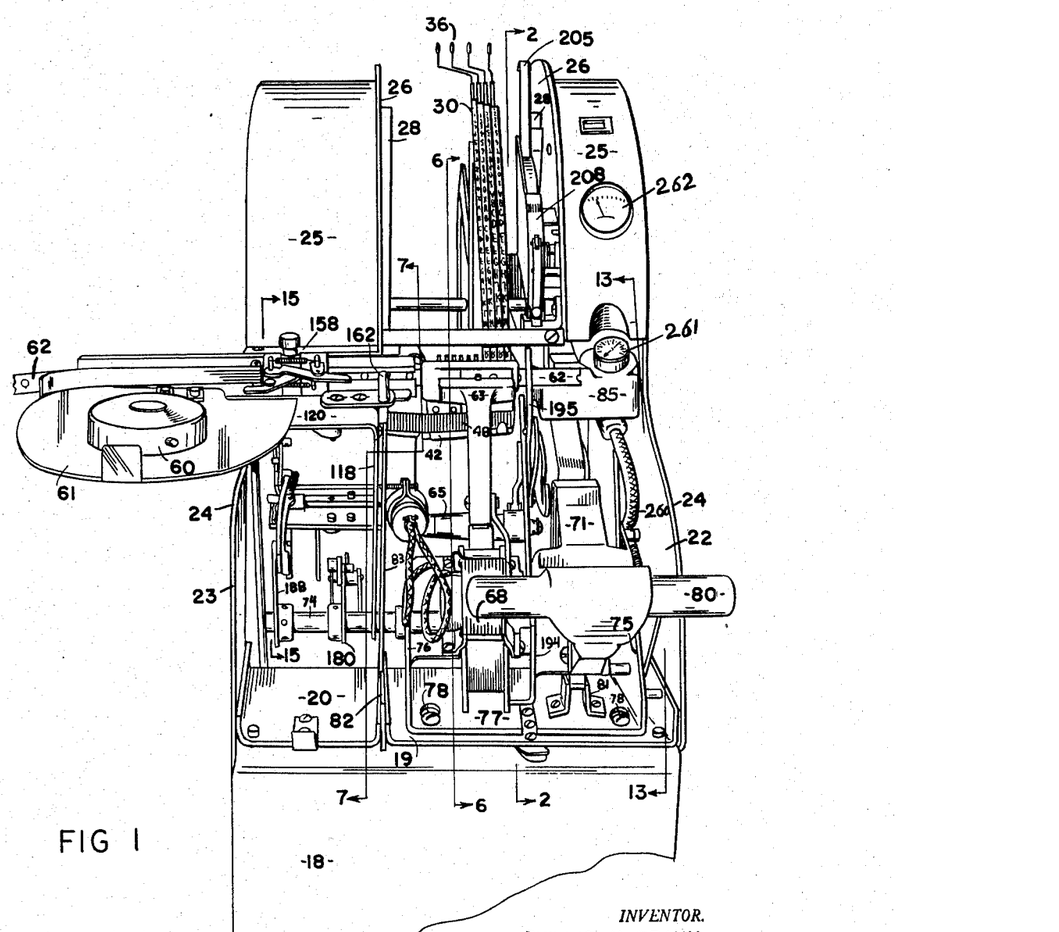
Figure 1 is a front elevational view, in perspective of a machine embodying my invention with portions of the machine housing removed.
Figure 6:
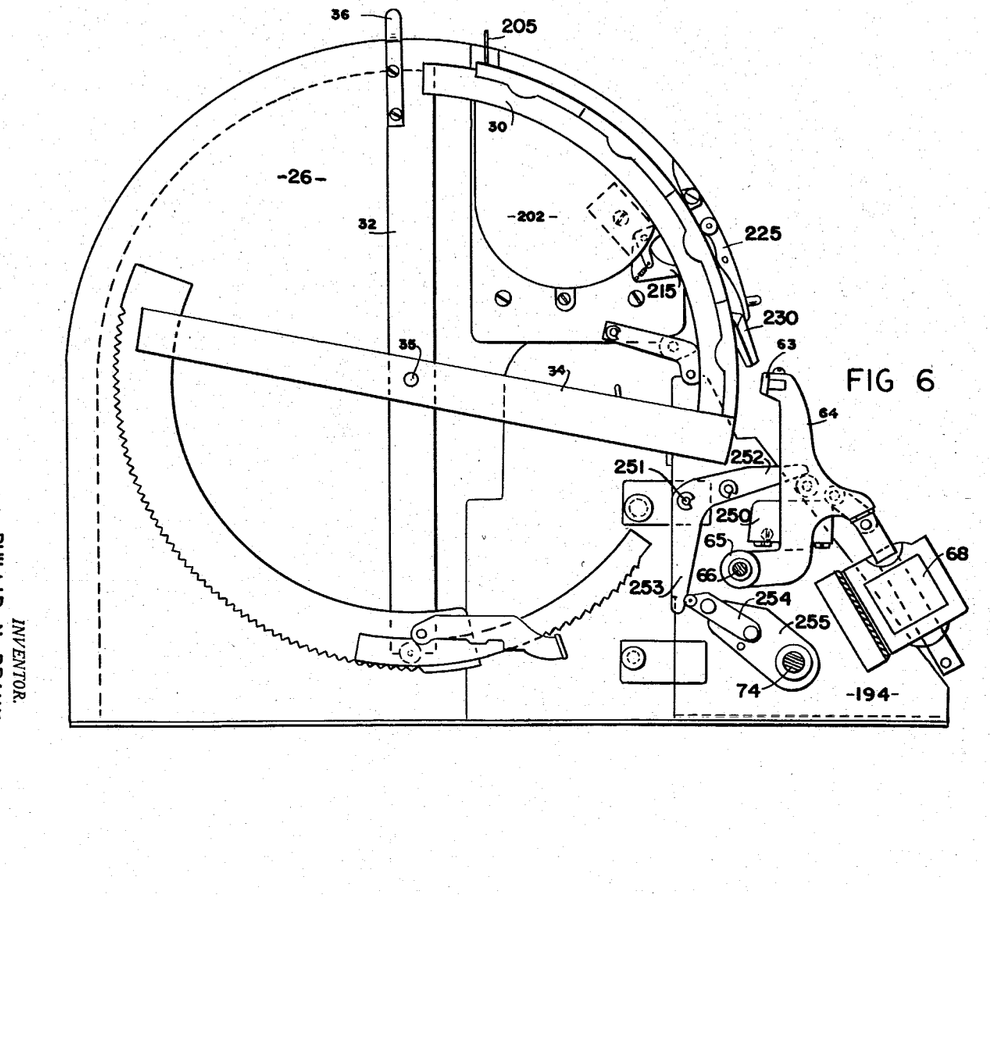
Figure 6 is a view taken on a line corresponding to line 6—6, Figure 1.

The frame of the machine includes outer side plates 22, 23, extending upwardly from the base. The front edges 24 of these plates are curved. The top edges are of arcuate formation and are formed with arcuate flanges 25 forming, in conjunction with inner confronting walls 26, spaced apart enclosures. The walls 26 are formed with vertically extending guide channels 28 to receive a type unit consisting of a plurality of type segments 30, see Figures 1 and 6. These segments are fixedly secured at their ends to bars 32, 34, the bar assemblies being pivotally mounted on a shaft 35, the ends of which are mounted in the guideways 28. Each type segment is provided with a handle 36 whereby the type segments may be adjusted to present the desired characters at a printing line.

Figure 15:
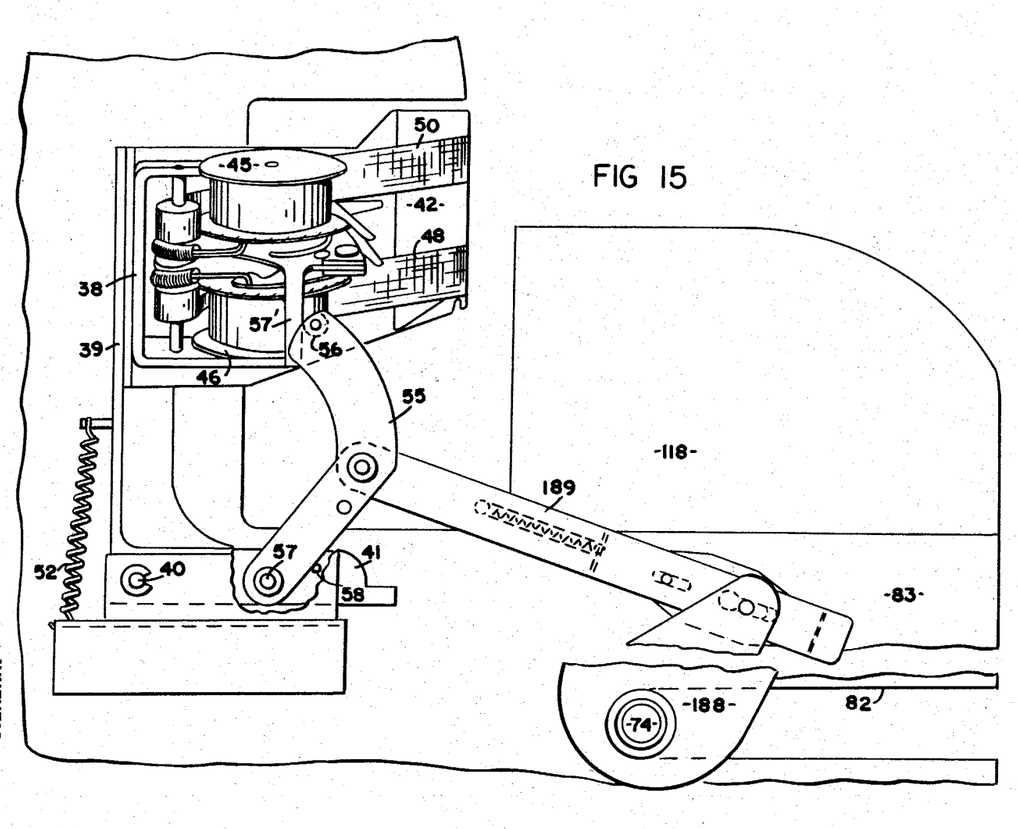
Figure 15 is a view taken on line 15—15, Figure 1, illustrating the ribbon mechanism, the view looking in the opposite direction from that of Figure 7.

In the left enclosure 25, there is mounted a ribbon mechanism, shown in Figure 15. This mechanism is of conventional arrangement consisting of a suitable bracket 38 detachably secured to a supporting bracket 39, pivotally mounted in the frame on a pin 40. The bracket 39 has a forwardly extending arm portion 41. The bracket 38 is formed with a plate portion 42 which extends in angular relation to the bracket 39 forwardly, and thence transversely of the printing type 30. This mechanism is provided with a pair of spools 45, 46, mounted for rotation about a vertical axis on bracket 38. The lower run 48 of the ribbon extends from the spool 46, across the plate 42, and is guided upwardly at the free end of the plate, and the upper run 50 of the ribbon returns across the printing line of the type to the spool 45. The supporting bracket 39 is urged in a counterclockwise direction, Figure 15, by a tension spring 52 to position the upper run of the ribbon against the printing type. The spools 45, 46, are intermittently actuated by a link 55, the lower end of which is pivotally connected to the arm 41 of bracket 39. The upper end of the link is provided with a pin and roller 56 which, upon forward movement of the link, engages a depending arm 57' connected with the spool actuating mechanism. When the link 55 is moved in a clockwise direction about its lower pivot 57, the link engages a pin 58 in the arm 41, rocking the supporting bracket about its pivot 40, moving the upper run of the ribbon 50 away from the type. When the link 55 is moved in a counterclockwise direction, the roller 56 engages the arm 57 to actuate the ribbon spool, and the link moves out of engagement with pin 58, permitting the arm 39 to be moved about its pivot 40 by the spring 52 to move the upper run of the ribbon against the type segments 30. The link 55 is actuated each time a tag is attached to a garment, as will be hereinafter explained.

The identifying tags are formed from a roll of tape positioned on a hub member 60 journalled on a plate 61. The tape 62 is unwound from the supply spool and is advanced to the right, Figure 1, by a tape feed mechanism mounted on the left hand portion of the machine. The tape 62 is advanced across the type segments 30 at the printing line, and is pressed against the upper run 50 of the ribbon by a printing platen 63 mounted on the upper end of an arm 64, the lower end of which is formed with a hub portion 65 journalled on a shaft 66, see Figures 1 and 6. The printing platen is operated in a counter-clockwise direction, Figure 6, by a solenoid 68. Subsequent to the printing of the leading portion of the tape 62, the tape is advanced to position the printed portion in overlying relation to a heat sealing iron. The tape is coated, or otherwise provided on the surface contacting the garment, with a heat activated adhesive material, such as thermoplastic or thermosetting materials.

The garment or other article is positioned over a platen 71 preferably having a resilient face member 72 formed of rubber or like material. The platen is fixedly mounted on the outer end of an arm 73, the lower end of which is fixedly mounted upon a shaft 74. This shaft is journalled horizontally in side plates 75, 76, of a U-shaped bracket, the base portion 77 of which is detachably secured to the top wall plate 19, as by screws 78, see Figure 1, and the rear portion of the bottom wall 77 is detachably secured to the plate 19 by a clamp 79, see Figures 13 and 14. The upper end of the arm 73 is provided with a pair of laterally extending handles 80.

Figures 14, 18:
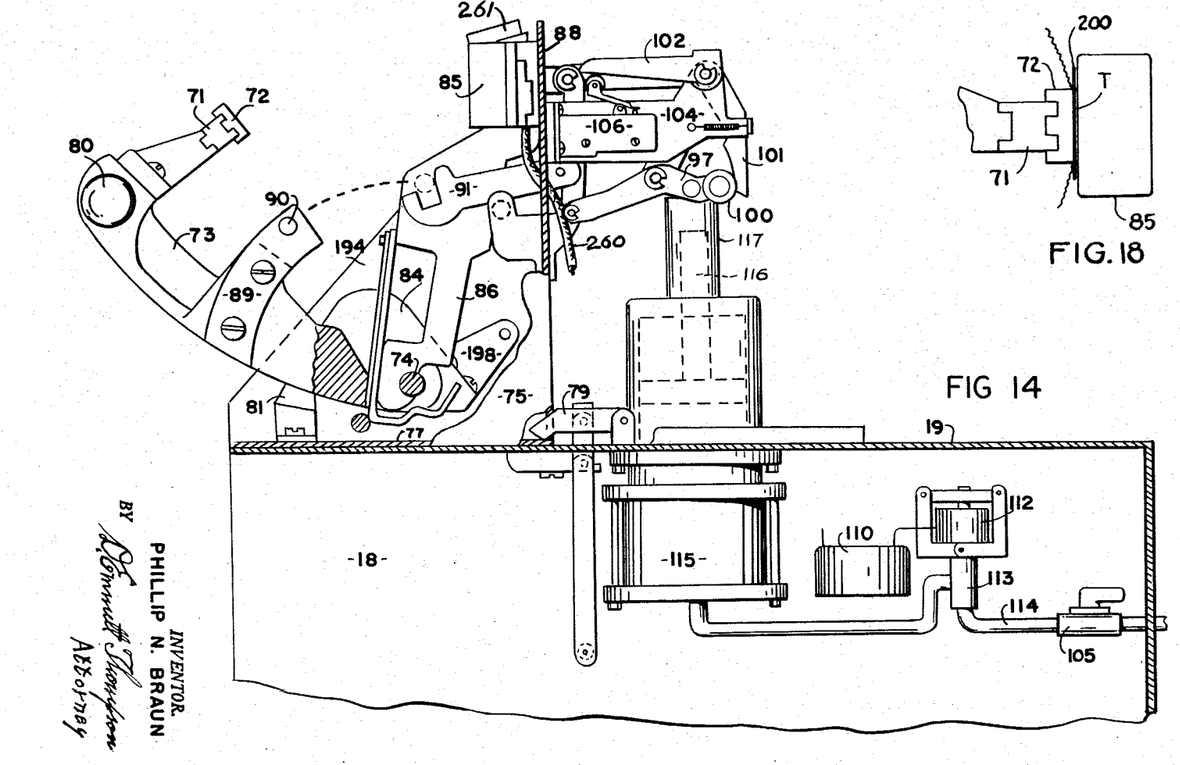
Figure 14 is a view corresponding to Figure 13, with the garment platen in open position and with the lower portion thereof broken away and partly in section.
Figure 18 is a view looking to the right, Figure 17, showing the platen pressing the garment against the tag.

In Figure 14, the platen is in open position resting upon a stop 81 mounted upon the bottom wall 77 of the unit. The shaft 74 extends to the left, Figure 1, through a slot 82 formed in an intermediate vertical plate 83.

The lower end of the arm 73 is of bifurcated structure and provided with a pair of spaced apart ear portions 84. The heat sealing iron 85 is mounted on the upper end of an arm 86, the lower end of which is positioned between the ear portions 84 and is formed with a concavity to receive the shaft 74. The upper portion of the heating iron 85 rests against a plate 88 extending vertically and connecting the side plates 75, 76.

In operation, the garment is tautened over the platen 71 and the arm 73 is manually moved upwardly toward the heating iron. The arm, intermediate its ends, has affixed on its sides a pair of arcuate shaped plates 89, each of which carries a laterally projecting pin 90. As the platen is moved towards the heating iron, these pins engage the outer ends of notched latch members 91. The inner ends of the latch members are pivoted to depending arms 92 of an angle lever, pivoted at 93 to a bracket 94 mounted on the plate 88. The rearwardly extending legs 95 of the angle lever are connected by a link 96 to an arm 97. This arm is pivotally mounted at one end to a bracket 98 by a pin 99. The free end of the arm 97 is provided with a roller 100 arranged to engage the depending leg portion 101 of a lever 102, pivoted at its angle to a supporting bracket 104 also carried by the plate 88. When the pins 90 engage the latch members 91, the bell crank lever 92, 95, is rotated about its pivot 93 in a counter-clockwise direction, Figure 13, lifting the arm 97 through link 96, whereby the roller 100 effects counter-clockwise movement of the angle lever 101, 102, to actuate a switch 106, also mounted on the bracket 104. At this time, the platen 71, with the garment thereon, is positioned in proximity to the heating iron 85 and the latches 91 have interlocked the pins 90.

Figures 13, 16:
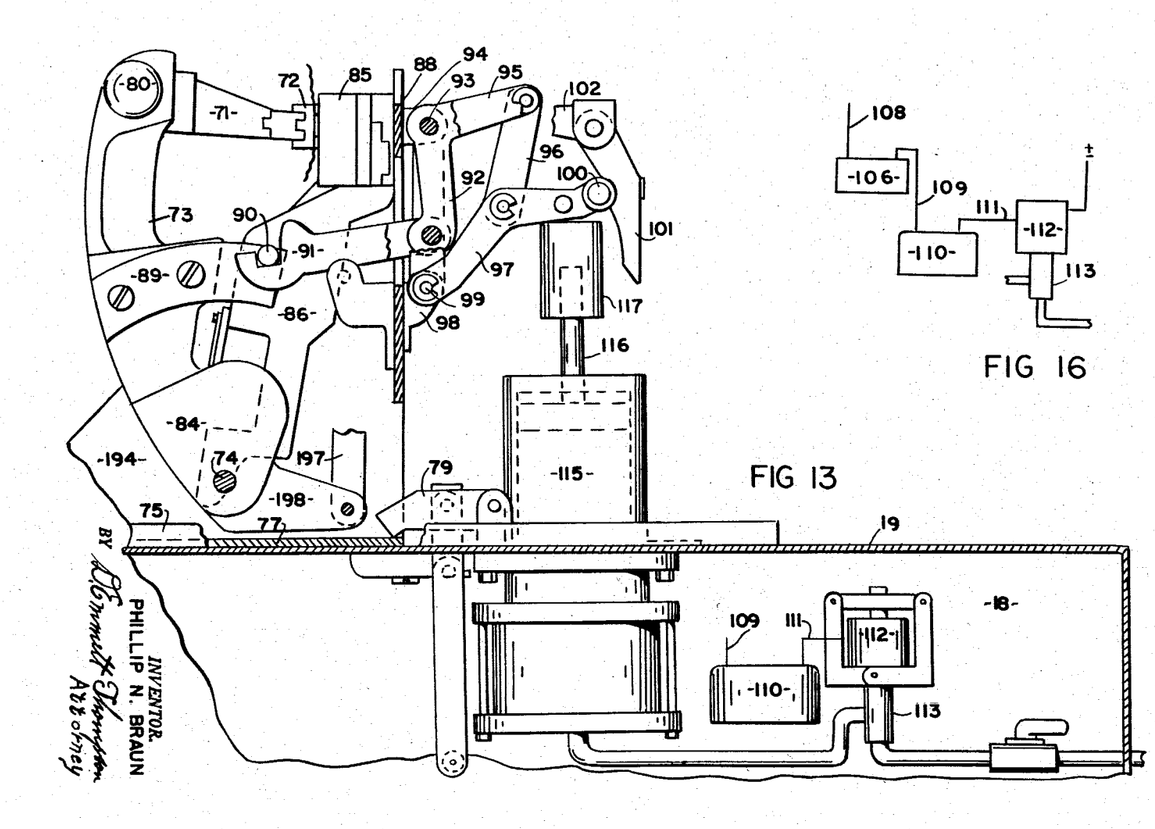
Figure 13 is a view taken on a line corresponding to line 13—13, Figure 1, showing the garment platen actuating mechanism with the garment platen engaging the heat sealing iron.
Figure 16 is a schematic wiring diagram of the electrical circuit for the actuating mechanism of the garment platen.

The switch 106 closes a circuit from a line 108, wire 109, to a timer 110, wire 111, to the solenoid 112 of a solenoid operated valve 113, causing this valve to open and admit fluid pressure from a supply line 114, to a cylinder 115, the piston rod 116 of which moves upwardly. The upper end of the piston rod is provided with a cylindrical button 117 engaging the outer portion of arm 97 to move it about its pivot 99, and through link 96, the bell crank lever 92, 95, is moved further in a counter-clockwise direction, pulling the platen under pressure against the heating iron 85, through the latch members 91. This pressure is adjusted by a regulator 105 in supply 114, and the duration of the applied pressure is determined by the setting of the timer 110. The pressure and timer are adjusted to effect proper heat sealing of the tag on the garment.

The mechanism for feeding the tape is disclosed particularly in Figures 9 to 12. The plate 61 is mounted upon a U-shaped bracket 120 fixed to the side wall 23 of the casing, and an intermediate wall 118 which is secured to the wall 83. The bracket 120 is formed with a pair of rearwardly extending flanges which are bent upwardly at 121 to receive and support a guideway 122. This guideway is formed on its upper and lower edges with lengthwise extending slots 123, and the forward side of the guideway is formed with a T slot 124. The bottom wall of the T slot is formed with a rectangular slot 125 in which there is mounted a channel member having a bottom wall 126 and side walls 127. One end of the U-shaped member is apertured to receive a screw 128, and the opposite end is formed with a tang portion 129, bent to overlie the end of the guideway adjacent the printing type 30. This tang portion is provided with a slot 130 to receive a screw 131. The channel member is yieldingly urged outwardly by a leaf spring 132, Figure 11. The tape 62 is positioned in the T slot 124, with the central portion of the tape exposed through the slot. The screws 128, 131, permit the U-shaped member to be positioned by spring 132, so that the outer edges of the sides 127 cause the tape 62 to be bowed outwardly, see Figure 10. This arrangement also effects a frictional drag between the tape and the guideway 122.

The tape is intermittently advanced toward the printing type by a feed pawl 140, and is moved rearwardly by a return pawl 141. The pawl 140 is pivotally mounted upon a pin 143 carried by a bracket 144. The return pawl 141 is pivotally mounted on a bracket 146 by pin 147. The brackets 144, 146 are secured to a carriage 150 having flanges 151, 152, slidably engaging the upper and lower edges of the guide member 122. The ends of the flanges are bent inwardly and are slidable in the slots 123, see Figure 10.

The pawls 140, 141, are formed with tail portions 154, 155, respectively. The opposite ends of the pawls project through slots formed in the carriage 150, and these end portions are formed with inclined surfaces 156, 157, see Figure 12. The pawls are yieldingly urged inwardly by tension springs 158. The tape 62 is formed with apertures 160, spaced uniformly along its length, and the spacing between these apertures is somewhat greater than the spacing between the inner ends of the pawls 140, 141.

Figure 12:
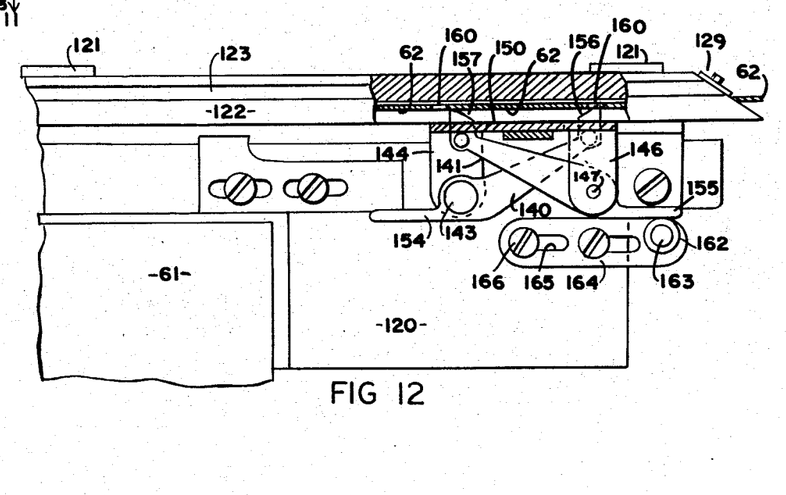
Figure 12 is a view of the tape feed mechanism taken on line 12—12, Figure 10.

In Figure 12, the feed pawl 140 is positioned in one of the apertures 160, and it will be apparent that as the carriage 150 is advanced forwardly to the right, the tape will be advanced by the feed pawl 140. The return pawl 141, however, is not positioned in the next succeeding aperature 160. First, because this aperture is spaced rearwardly from the point of the return pawl and secondly, the tail portion 155 is in engagement with a roller 162 mounted upon a pin 163 carried by a plate 164. This plate is mounted upon the bracket 120 and is adjustable in a direction lengthwise of the guide member 122. This adjustment is effected by the plate 164 being formed with elongated apertures 165 for the reception of clamping screws 166 threading into the bracket 120. The arrangement is such that during the last portion of the advancement of the carriage, the return pawl 141 is cammed out of engagement with the tape, and it is maintained out of such engagement during the initial return movement of the carriage—this to prevent the pawl, upon the initial return movement of the carriage, from entering the next adjacent aperture 160 in the tape 62. Upon return movement of the carriage, the feed pawl 140 will ride out of the aperture 160 in which it has been positioned, during feeding of the tape, because of the inclined surface 156 on the end of the pawl confronting the tape.

After the carriage has completed part of its return movement, the tail portion 155 of the return pawl 141 moves out of engagement with the roller 162, whereby the spring 158 attached to the pawl causes the end portion of the pawl to enter the next succeeding aperture whereby, upon the remainder of the rearward movement of the carriage, the tape is moved rearwardly for a purpose hereinafter explained.

The carriage 150 is also provided with a depending bracket 170, the lower end portion 171 of which extends inwardly below the guideway and is provided with a pin 172 positioned in a groove collar 173 fixed to a piston rod 174 operating in a cylinder 175 which is attached to the guideway. The piston rod 174 is moved to the left, Figure 9, by a spring mounted in the cylinder and is moved to the right when fluid pressure is applied to the cylinder through the conduit 176. This conduit is connected to a valve 177 mounted in the plate 20, see Figure 7.

The left extension of the shaft 74 is provided with an arm 180, which carries a member 181 mounted on pivot pin 182. This member 181 has a roller 183 arranged to engage a lever 184 pivoted at 185 to a bracket 186. When the roller 183 engages the lever 184, the air valve 177 is opened, admitting air through the conduit 176 to the cylinder 175, effecting forward movement of the feed carriage 150 for a predetermined distance. The arrangement of this actuating mechanism for the valve 177 is such that the valve is opened for the feeding of the tape immediately after the printing operation is performed, which is during movement of the garment platen toward the heat sealing iron. The valve 177 is maintained in open position by the roller 183 riding on the inner arcuate surface of the lever 184. The tag is severed from the tape just prior to the pressing of the garment against the tag, whereby the valve 177 is held open and the tape feed is maintained in advanced position. Immediately upon rearward movement of the garment platen, the arm 180 is rotated in a counterclockwise direction Figure 7, whereupon the member 181 rotates about its pivot 182 in a clockwise direction, removing the roller 183 from the arm 184, allowing the valve 177 to close, connecting the conduit 176 to an adjustable exhaust port 187, permitting the spring within cylinder 175 to return the carriage 150.

Figure 7:
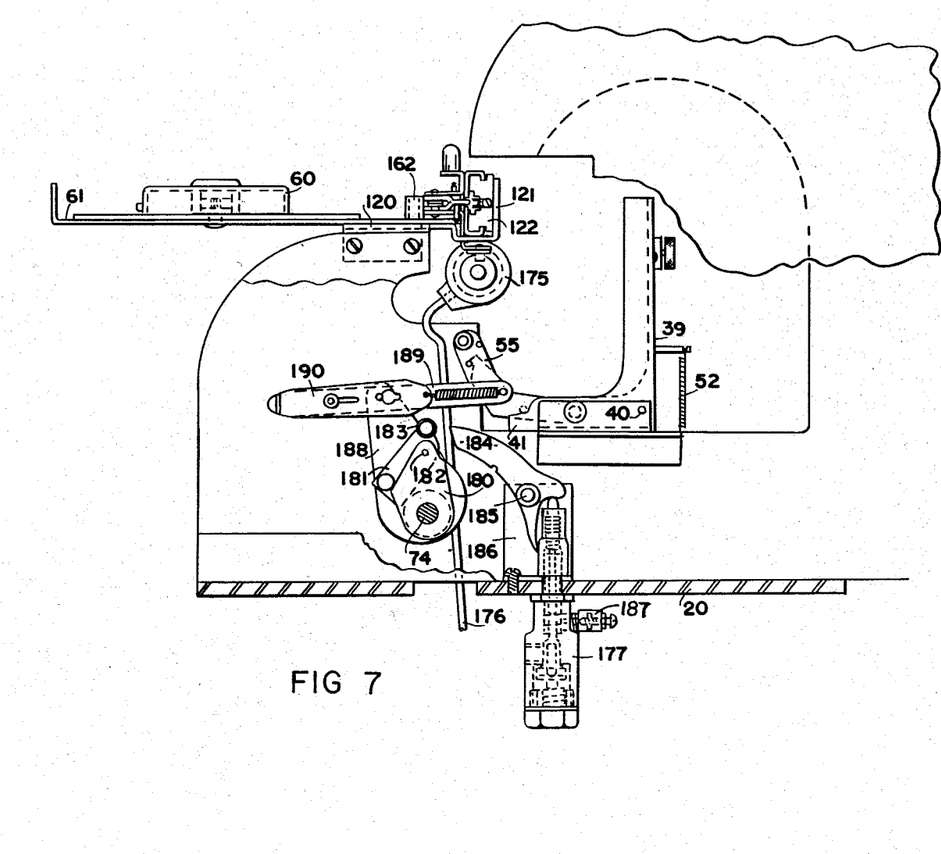
Figure 7 is a view taken on line 7—7, Figure 1, with the ribbon mechanisms omitted.
Figure 8:
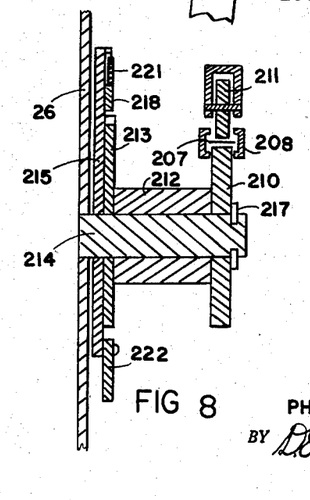
Figure 8 is a view taken on a line indicated by the line 8—8, Figure 3.
Figure 9:
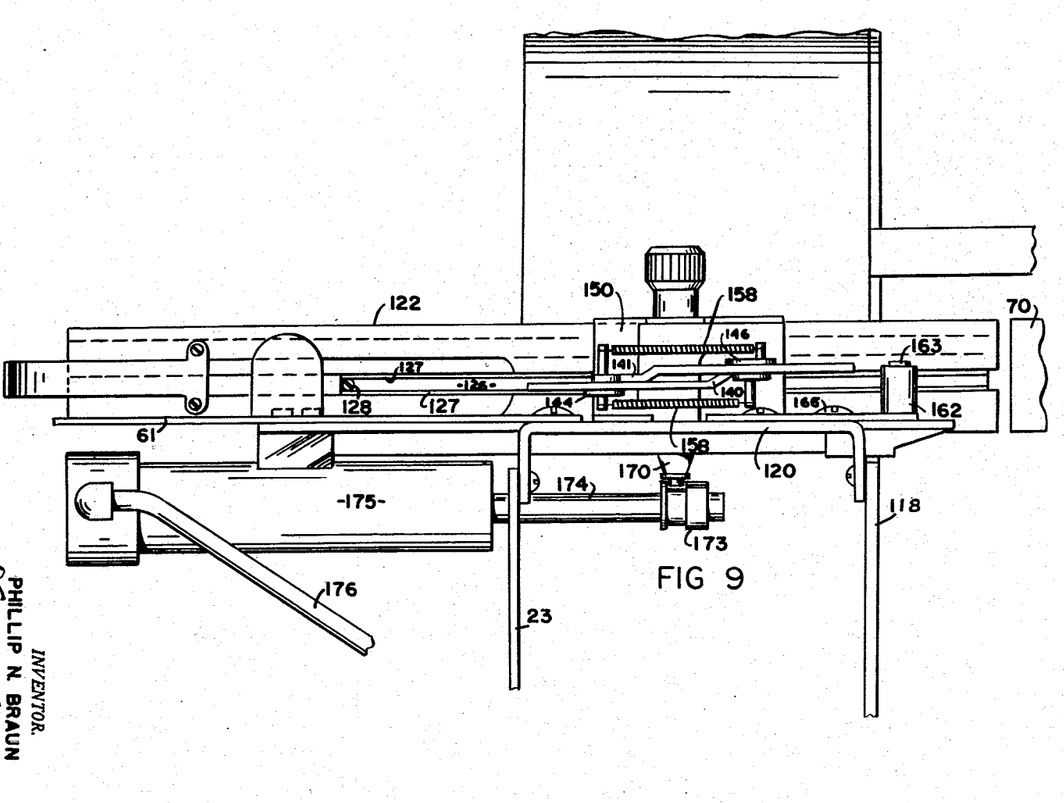
Figure 9 is an enlarged front elevational view of the tape feed mechanism.
Figure 10:
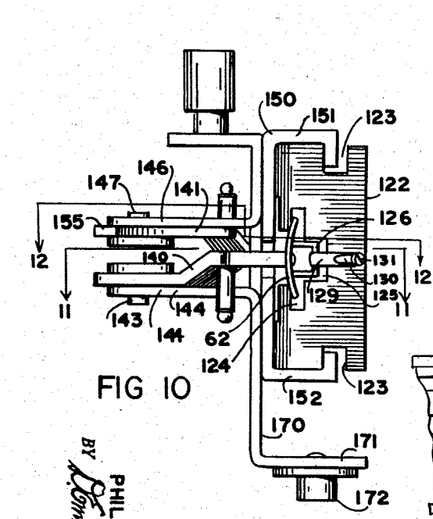
Figure 10 is an end view of the tape feed mechanism with the piston and cylinder structure omitted, the view looking to the left, Figure 9.

The shaft 74 also has affixed to it an arm 188 which is connected to a link 189 which, in turn, is connected to the arm 55 for actuating the ribbon mechanism, see Figures 7 and 15. The arm 188 is provided with a pin that is positioned in a keyhole aperture in the link 189 and is retained in operative relation by a slide member 190. This arrangement is to permit the link 189 to be disconnected from the arm 188 when the unit, including the printing and garment platens, is removed from the casing.

Figure 2:
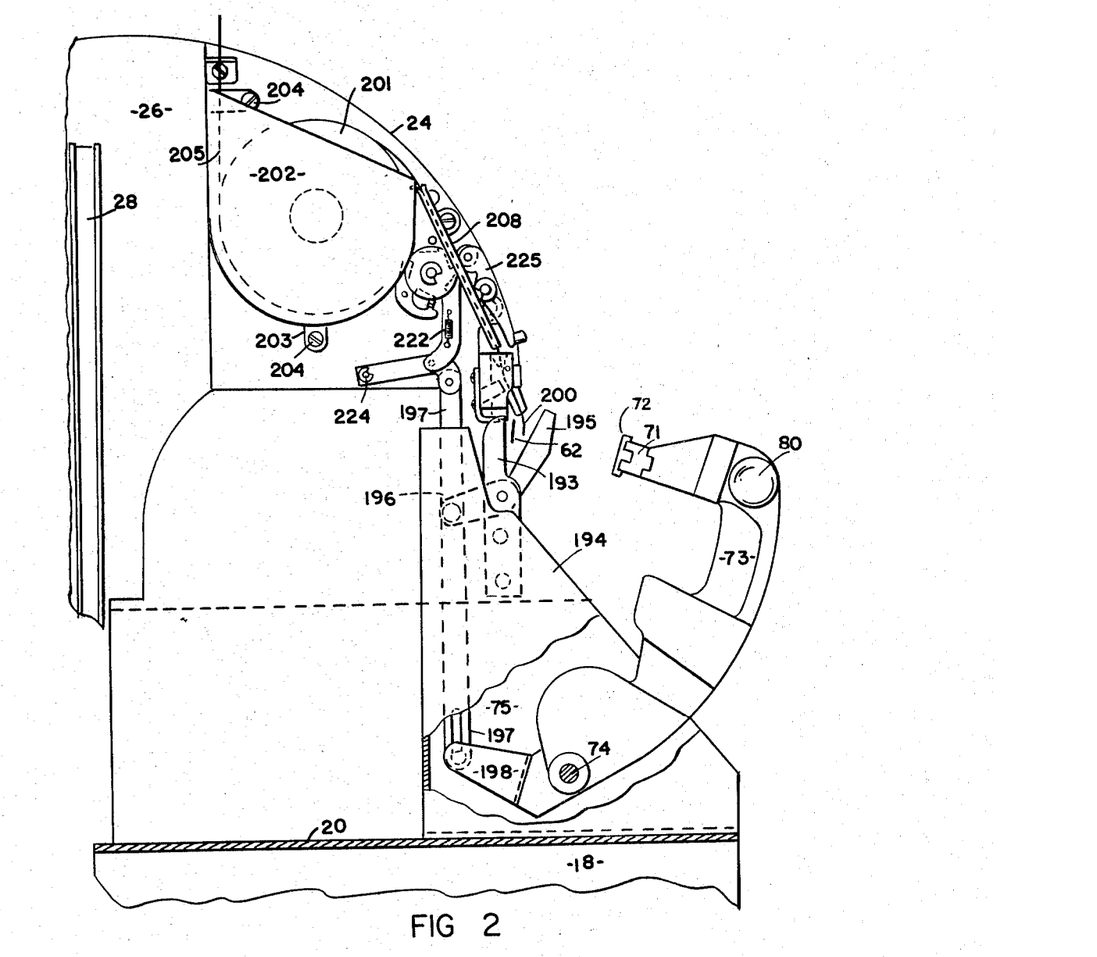
Figure 2 is a view taken on a line corresponding to line 2—2, Figure 1, illustrating the tab feed mechanism and tape shear.
Figure 2:
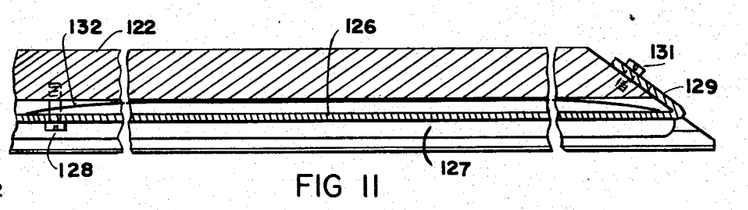
Figures 3, 17:
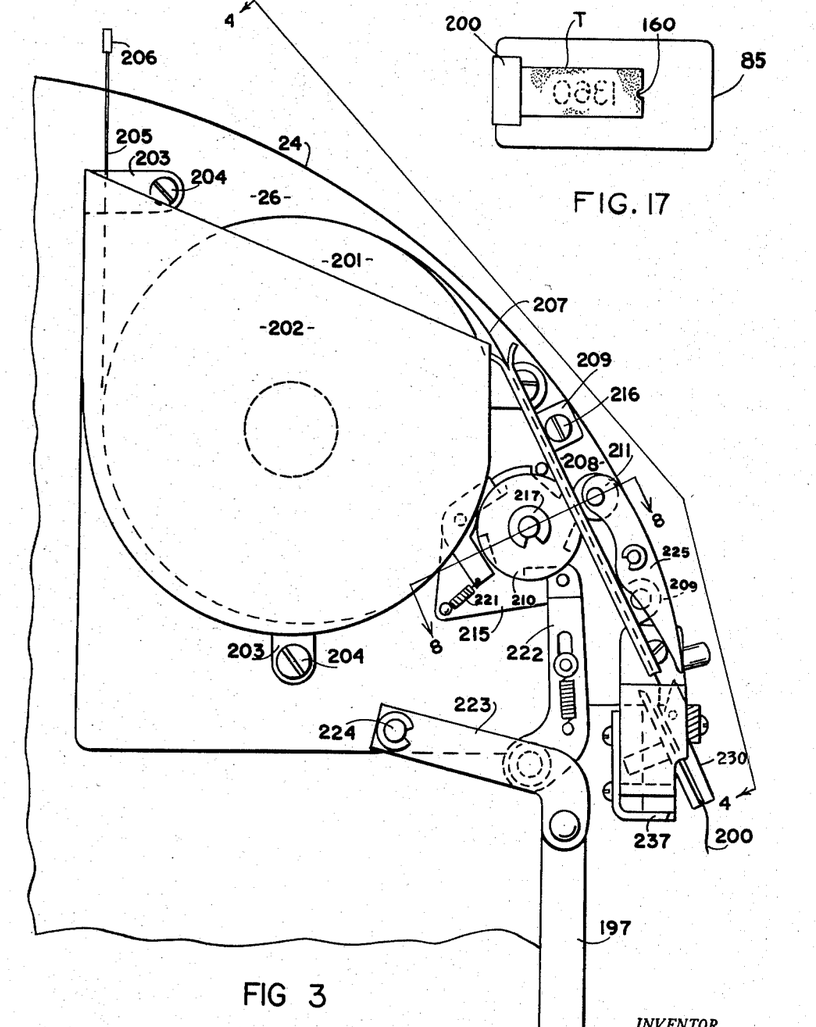
Figure 3 is an enlarged view of the structure shown in the upper portion of Figure 2.
Figure 17 is a face view of the heat sealing iron showing the tag and tab positioned thereon.
Figure 4:
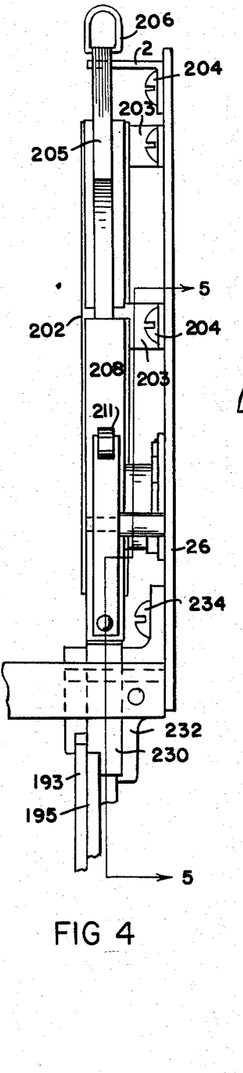
Figure 4 is a front elevational view of the tab feed mechanism, the view being indicated by the line 4—4, Figure 3.

The printed portion of the tape 62, positioned in overlying relation to the heating iron 85, is severed by a shear mechanism to form the tag T, see Figure 17. This shear mechanism consists of a stationary blade 193 fixedly mounted on a vertically extending plate 194 mounted intermediate the plates 75, 76, and a movable blade 195 pivotally mounted on the fixed blade and having a rearwardly extending portion 196 to which there is pivotally connected a vertically extending link 197, the lower end of which is connected to an arm 198 attached to the garment platen arm 73, see Figures 2 and 13. The arrangement is such that when the garment platen is moved in proximity to the heating iron 85, the movable shear blade 195 coacts with the stationary blade 193 to sever the printed portion of the tape.

Due to the space between the type segments and the heat sealing iron, in which the tape shear is mounted, the tape is fed a distance exceeding the length of the severed tag. Accordingly, after severance of the tag, the tape extends to the right, Figure 1, from the type segments to the shear. This portion of the tape would normally not be printed upon and would accordingly be wasted. However, upon return movement of the carriage 150, the tape is retracted, as previously explained, so that the end portion of the tape is re-positioned in registration with the printing type segments.

The tape, or at least the forward side surface thereof, is coated or provided with a heat sealing material which, when activated by the heat of the heating iron 85, causes the severed tag to adhere to the garment or other article. In order to permit the attached tag to be conveniently removed from the garment or other article, a seal barrier is positioned between one end portion of the tag and the garment. This barrier consists of a tab 200 formed from a strip of sheet material non-sealable to the garment. This strip material is provided in the form of a roll 201 positioned in a holder 202 having braces 203 attached to the wall 26, as by screws 204. The roll 201 is positioned in a cradle member consisting of a metallic band 205, one end of which is secured to the forward side of the holder 202. The band 205 extends upwardly from the rear portion of the holder and is provided with a handle portion 206. With this arrangement, the roll 201 of strip material may be conveniently inserted and removed from the holder 202 by raising the band 205. The free portion 207 of the strip material is fed downwardly through a chute 208 formed with ears 209 attached to the wall 26, as by screws 216. The inner and outer walls of the chute are slotted intermediate the ends of the chute to receive a feed roll 210 and a pressure roll 211.

The feed roll 210 is fixedly mounted to a hub portion 212 which carries a ratchet wheel 213, the assembly being journalled upon a stud 214 fixedly mounted in the plate 26. A plate 215 is rotatably mounted upon the stud 214 between the ratchet wheel 213 and the plate 26. The assembly is retained on the stud by a snap washer 217. The plate 215 has pivotally mounted on it a pawl 218, the end of which is urged into the notches 220 of the ratchet wheel by a spring 221. The plate 215 has pivotally connected to it an arm 222, the lower end of which is connected to a link 223, having one end pivotally connected, as at 224, to the side wall 26, and the opposite end connected to the vertically extending link 197. With this arrangement, when the garment platen 73 is moved toward the heating iron, the ratchet wheel 213, and the feed roll 210, are moved in a clockwise direction, Figures 3 and 5, to feed the tab strip downwardly through the chute 208.

Figure 5:
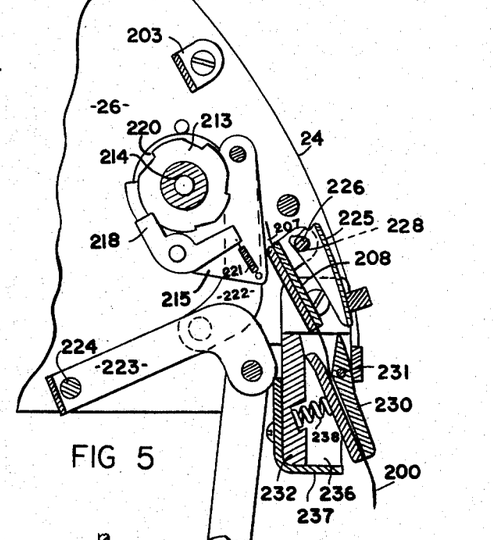
Figure 5 is a view taken on line 5—5, Figure 4.

The pressure wheel 211 is mounted in a yoke 225 mounted on a pin 226 carried by an ear 228 on the chute 208. The yoke 225 is spring actuated whereby the roller 211 presses the strip against the feed wheel 210.

As the strip 207 leaves the chute 208, it passes through a shear member 230, see Figures 3 and 5, which is pivotally mounted on a pin 231 in a housing 232 secured to the side wall 26, as by screw 234. The housing is formed with a slot 236 to receive the shear member 230, and the housing is provided with a shear plate 237 which coacts with the lower end of the shear member 230, when the same is moved inwardly, to sever the depending tab 200 from the strip. The shear member is yieldingly urged outwardly by a compression spring 238 and is moved inwardly to shear the strip by being contacted by the upper end of the movable shear blade 195, whereby the tab 200 is severed from the strip 207 simultaneously with the severance of the printed portion of the tape to provide the tag for attachment to the garment.

It will be understood that at this time the garment platen is actuated by the cylinder and piston structure 115 shown in Figures 13 and 14. The tab 200, depending from the movable shear member, is positioned forwardly of the printed tag portion of the tape, as illustrated in Figure 2, whereby the tab is positioned between the tag and the garment, the tab overlying the left end portion of the tag and thereby preventing the same from being sealed to the gament. Accordingly, there is provided a free end portion of the tag, which may be readily grasped for convenient removal of the tag from the garment.

With the arrangement described, the tape and tab strip are fed and positioned automatically upon each operation of the garment platen. The solenoid 68, for operating the printing platen, is energized by a switch 250 mounted on plate 194. This switch is closed by an angle lever pivoted at 251, and has a forwardly extending leg 252 engaging the actuator of the switch, and a downwardly extending leg 253 engaged by a member 254. The member is pivotally connected to an arm 255 fixed to the main shaft 74.

When the garment platen is initially moved toward the sealing iron 85, the member 254 engages the leg 253, moving the leg portion 252 downwardly to move the switch to on position, whereby the solenoid is energized, and the platen 63 is pressed against the tape and the latter against the type 30 to print the tag. This operation takes place prior to the feeding of the tape.

The heating iron 85 is electrically heated by power supplied through cable 260. The iron is supplied with a heat indicator 261, and a gauge 262 is mounted in the housing portion 25 for indicating the setting of the regulator 115.

In addition to serving as a seal barrier for the tag, the tab also serves as a marker to convey additional information as to routing, processing, etc. This is accomplished by using different colors of strip material from which the tabs are made. The feed for the strip material forming the tab is adjusted so that the lower end of the tab depends below the lower edge of the tag T, and the shear 230 is positioned to shear the tab 200 from the strip with the tab extending upwardly a distance from the upper edge of the tag. This permits different colored tabs to be readily noticeable.

What I claim is:

1. A tape feed for laundry marking machines comprising a guideway formed with a T slot in one side receiving and guiding a tape with the central portion of the tape exposed through said slot, a carriage slidably mounted on said guideway for reciprocation lengthwise thereof, said tape being formed with apertures uniformly spaced apart lengthwise of the tape, a feed pawl and a return pawl mounted on said carriage, spring means operable to yieldingly urge said pawls into engagement with the apertures in said tape, said feed pawl being operable upon forward movement of the carriage to engage an aperture in said tape to advance the same forwardly and to automatically disengage from the tape upon rearward movement of the carriage, said return pawl being operable upon return movement of the carriage to engage another one of the apertures in said tape to effect return movement thereof and to automatically disengage from the tape upon forward movement of the carriage, power means operable to effect forward movement of the carriage a predetermined distance along said guideway and to effect return movement of said carriage, and means operable to maintain said return pawl disengaged from the tape upon the initial return movement of said carriage.

2. Mechanism for feeding tape in laundry marking machines, said tape being formed with apertures spaced apart uniformly along its length, said mechanism comprising a guideway formed with a T slot in one side for receiving and guiding the tape and through which the central portion of the tape is exposed, a carriage mounted for movement lengthwise of said guideway, a feed pawl and a return pawl mounted on said carriage, said pawls being spaced apart in a direction lengthwise of the tape a distance less than the spacing between the apertures in the tape, spring means for yieldingly urging said pawls into the apertures of the tape to effect advancement of the tape upon forward movement of the carriage and return movement of the tape upon return movement of the carriage, power means connected to said carriage and operable to reciprocate the same forwardly and rearwardly a predetermined distance exceeding the spacing between said tape apertures, and means cooperable with said return pawl to maintain the same out of engagement with the tape during the initial return movement of the carriage.

3. Mechanism for feeding tape in laundry marking machines, said tape being formed with apertures spaced apart uniformly along its length, said mechanism comprising a guideway formed with a T slot in one side for receiving and guiding the tape and through which the central portion of the tape is exposed, a carriage mounted for movement lengthwise of said guideway, a feed pawl and a return pawl mounted on said carriage, said pawls being spaced apart in a direction lengthwise of the tape a distance less than the spacing between the apertures in the tape, spring means for yieldingly urging said pawls into the apertures of the tape to effect advancement of the tape upon forward movement of the carriage and return movement of the tape upon return movement of the carriage, power means connected to said carriage and operable to reciprocate the same forwardly and rearwardly a predetermined distance exceeding the spacing between said tape apertures, a pawl engaging member adjustable lengthwise of said guideway and being operable to engage and maintain said return pawl out of engagement with the tape upon initial return movement of the carriage.

References Cited in the file of this patent

UNITED STATES PATENTS 2,702,491    Favre ________________ Feb. 22, 1955